United States Patent [19]

Spangle

[11] Patent Number: 4,797,159
[45] Date of Patent: Jan. 10, 1989

[54] EXPANDABLE CEMENT COMPOSITION

[75] Inventor: Lloyd B. Spangle, Claremore, Okla.

[73] Assignee: Dowell Schlumberger Incorporated, Tulsa, Okla.

[21] Appl. No.: 890,672

[22] Filed: Jul. 25, 1986

[51] Int. Cl.$^4$ .......................... C04B 7/02; C04B 7/32; C04B 9/00; C04B 11/02

[52] U.S. Cl. ...................................... 106/89; 106/104; 106/110; 106/121; 166/292

[58] Field of Search ................. 106/89, 104, 110, 314, 106/121; 501/108; 423/636; 166/292

[56] References Cited

U.S. PATENT DOCUMENTS

| | | | |
|---|---|---|---|
| 2,703,273 | 3/1955 | Robertson et al. | 423/636 |
| 3,921,717 | 11/1975 | Danjushevsky et al. | 166/292 |
| 4,046,583 | 9/1977 | Collepardi | 106/98 |
| 4,059,391 | 11/1977 | Hart | 501/108 |
| 4,302,251 | 11/1981 | Udagawa et al. | 106/92 |
| 4,370,422 | 1/1983 | Panda et al. | 501/108 |

FOREIGN PATENT DOCUMENTS 340635  7/1972  U.S.S.R. ................................ 106/89

OTHER PUBLICATIONS

V. S. Danyushevsky, "Methods for Producing Expandable Plugging Cements for Gas Wells", Gazovaya Prom., No. 11, pp. 10–13, Nov. 1973.

V. S. Danyushevsky et al., "Expandable Plugging Cement for Gas Wells", Cement v. 32(2), pp. 10–11, 1966.

Primary Examiner—Mark L. Bell
Attorney, Agent, or Firm—Stephen A. Littlefield

[57] ABSTRACT

Particulate magnesium oxide prepared by calcining magnesium oxide at between about 1100° C. and about 1500° C. At least about 80% of the magnesium oxide particles are between about 150 microns to about 400 microns in diameter. This magnesium oxide is capable of producing expansion in set cements when the temperature thereof is at least about 60° C. Preferably the magnesium oxide has been calcined at between about 1100° C. to about 1300° C. for about 1 to about 3 hours, and at least about 80% of the particles are between about 200 microns to about 325 microns. Further, the BET surface area of the particles is preferably between about 0.8 to about 1.8 m$^2$/g, and the acid neutralization time (using the method described) is between about 15 to 20 minutes, and further preferably between about 17 to about 25 minutes. Expandable cement compositions using such magnesium oxide, and a method of using them in cementing of wells, are also disclosed.

22 Claims, 1 Drawing Sheet

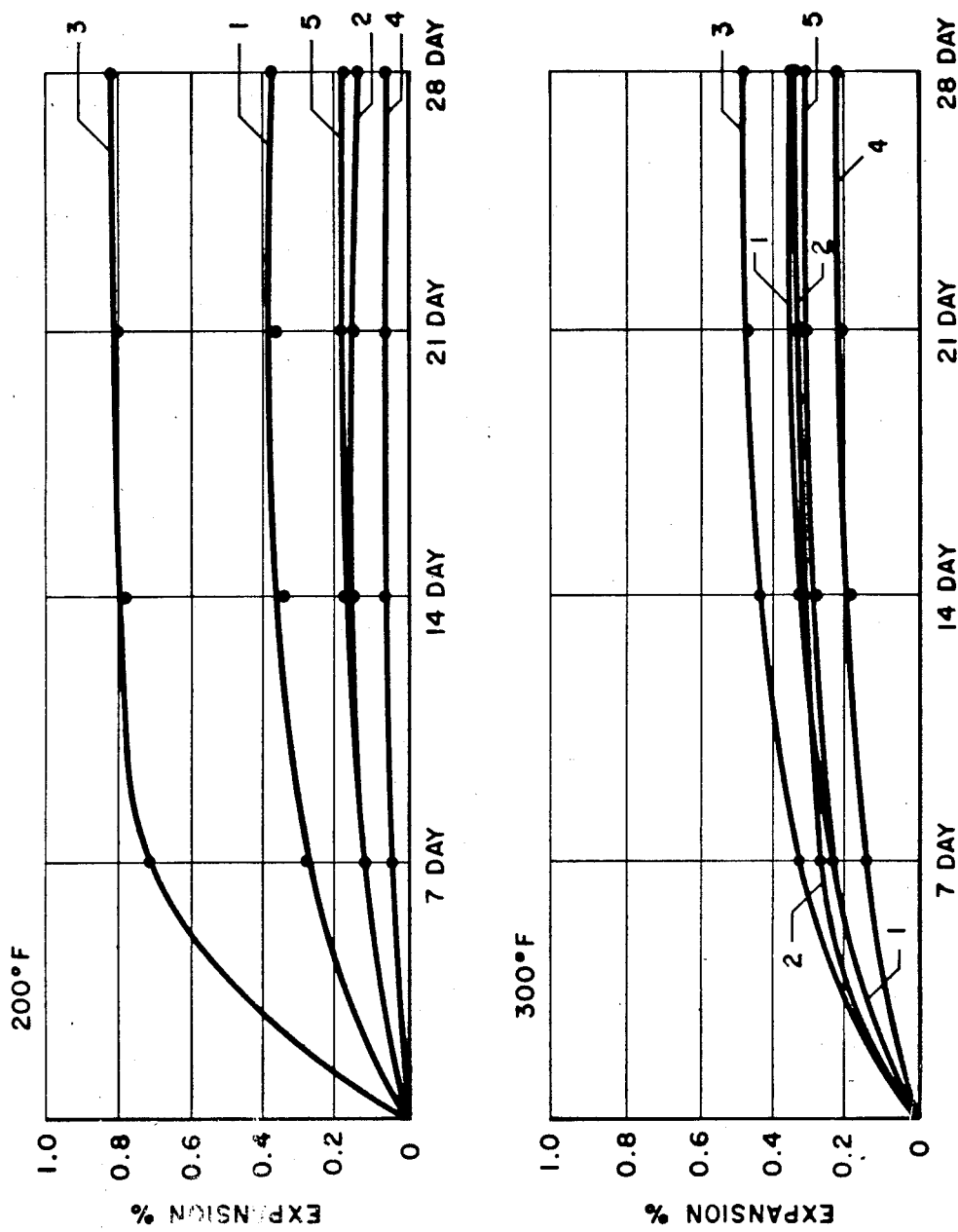

EXPANDABLE CEMENT COMPOSITION

FIELD OF THE INVENTION

This invention relates to an expandable cement composition. The composition is particularly useful for cementing a casing in place in a bore of an oil, gas, or other well, which may experience at some point in time a relatively high bottom hole static temperature(BHST).

TECHNOLOGY REVIEW

A well-known practice in oil, gas, or other wells, which have a bore penetrating a number of earth formations, is to cement a steel casing in place within the bore by placing cement slurry between the steel casing and the bore walls. Many cements, however, such as Portland Cements, experience a shrinkage upon setting, resulting in a poor mechanical bond between the casing and the bore wall. Such situation may allow undesirable fluid (which term includes liquids and gasses) communication between different formation zones penetrated by the bore, or even allow fluids produced from certain zones to undesirably leak to the surface. Such situation can be exacerbated for example, when temperature or pressure variations cause contraction of the casing.

A solution to the foregoing problem, is to compensate for the shrinkage of the cement, by adding an expansive agent to the cement. Ideally, the expansive agent will overcompensate for the cement shrinkage which might otherwise occur, resulting in a net expansion. By "net expansion", or simply "expansion" of a cement, is meant that the unrestrained set cement will exhibit a volume increase over its liquid (i.e. slurry) phase. Such net expansion helps ensure a good cement bond to both the casing and the bore wall. The expansive agent must be designed such that, at the temperature to which the liquid cement will be exposed, it does not attempt to produce most of its expansive effect while the cement is still liquid. If the effect of the expansive agent is expended while the cement is liquid, there will be no net expansion of the set cement. Furthermore, for practical reasons, it will often be desirable that the expansion in the set cement must be at a practical rate under the temperature and other conditions to which it is to be exposed in use.

In some wells, a relatively low BHST may initially or normally be present. However, subsequent procedures involving such wells may later raise their BHST substantially. Such can occur for example in geothermal wells or wells exposed to heat from fire flooding procedures. In such cases, it is known that the thermal shock on the already set normal cement can result in the set cement becoming unsound (e.g., losing compressive strength). It would be desirable then to have a cement composition which would at least not suffer as much from this thermal shock effect. It has been discovered that this may be accomplished by providing an expansive agent in the cement, which agent will produce most of its expansion only upon the later raising of the BHST.

One known expansive agent comprises calcium sulfate. When the foregoing is present in Portland cement slurry, an expansive component, namely tricalcium sulfoaluminate hydrate, is produced which results in expansion of the set cement. The expansion which results from use of calcium sulfate, however, is considerably reduced when the temperature to which it is exposed is about 77° C. or greater. Furthermore, expansion results from a direct chemical reaction between the tricalcium aluminate present in the Portland cement, and the calcium sulfate. Thus, the use of calcium sulfate as an expansive agent in cements for cementing a well casing in a wellbore, is limited to those wells having a BHST of less than about 77° C., and in which are used cements with a high tricalcium aluminate content.

The use of magnesium oxide (MgO) as an expansive agent in cements has been suggested previously by V. S. Danyushevsky in "Methods For Producing Expandable Plugging Cements For Gas Wells", Gazovaya Prom No. 11, pages 10-13, November, 1973. The foregoing article deals primarily with the use of calcium oxide typically calcined at between about 850° C. and about 1400° C., as an expansive agent in amounts of between 7 and 15 percent (%). It is also suggested that for hotter wells with temperatures of up to 180° C., magnesium oxide calcined at 1200° to 1300° C. can serve as an expanding additive. At temperatures higher than 160° C., magnesium oxide calcined at 1600° C. is suggested as an expanding additive. The article makes general allegations to the effect that the rate of hydration of magnesium oxide can be controlled by means of its "fineness of grinding". However, there is no indication as to the amount of magnesium required, nor is there any indication as to the size or surface area of the magnesium oxide particles.

In an earlier article, by S. I. Danyushevsky and R. I. Liogonkaya, entitled "Expandable Plugging Cement For Gas Wells", CEMENT, V.32(2) 1966 P.10-11, the plugging of gas wells using cements with a magnesium oxide expansive additive, was disclosed. When amounts of magnesium oxide of about 8% were used in cements with up to 6% tricalcium aluminate, and with an increased quantity of gypsum up to 6-7%, linear expansions of about 0.4% after 28 days were obtained at 75° C. and atmospheric pressure. Tests were apparently conducted with magnesium oxide calcined at up to 950° C. Neither particle size nor surface area of the magnesium oxide, was controlled in any of the test results disclosed in that paper.

U.S. Pat. No. 4,002,483 discloses an expansive cement composition containing about 1 to 70% calcium oxide by weight of the composition, and about 2 to 7% magnesium oxide by weight of the composition. The patent indicates that the composition can be manufactured from magnesium oxide, calcium oxide and other conventional ingredients that are normally fed to a Portland cement kiln, such that the composition will also contain tricalcium silicate, tricalcium aluminate, and tetracalcium aluminoferrate, as well as other impurities. The composition is reacted in a conventional cement kiln at a temperature range of 2500° F. to about 2900° F., which the patent indicates will inherently cause the magnesium oxide to "become diffused throughout the composition in the form of very fine crystallites of crystals of periclase, the vast majority of which have a size no greater than about 10 microns." The composition can be used by itself or in amounts of 1 to 99% of the composition with Portland Cement, at atmospheric temperatures, in order to more efficiently "grab" steel enforcing bars embedded within the set composition.

U.S. Pat. No. 4,046,583 likewise discloses an expansive cementitious composition, apparently for use at atmospheric temperatures, containing calcium oxide and/or magnesium oxide. The patent apparently contemplates that the foregoing mixture be combined with a cement in the amount of about 0.5 to 40% of the mixture based upon weight of cement (BWOC). There is no discussion in the patent on the affect of calcining magnesium oxide at various temperatures, nor the affect of particle size or surface area of magnesium oxide.

U.S. Pat. No. 4,394,174 discloses a fast setting mortar composition for road filling, etc. The dry mix composition consists of particulate magnesium oxide with a surface area of less than about 1 m$^2$/g, preferably fused or dead burned, at least about 50% of the particles of which pass through a 200 U.S.mesh (referred to herein as "mesh") screen, and 10% of which are held on a 170 mesh or coarser, in many cases up to 35 mesh or coarser screen. The composition contains about 3 to 25% by weight of the foregoing magnesium oxide, as well as 10 to 15% of aluminum phosphate, and 50 to 82% inert aggregate, such as sand and gravel.

Japanese Pat. No. 73,423 (issued June 16, 1984) also discloses the use of magnesium oxide as an expansive agent in concrete, for the manufacture of steel pipe concrete composites. The magnesium oxide is used in the concrete in amounts of between 10 to 50 kilograms per cubic meter of concrete, and is produced by calcination of magnesium oxide at temperatures of greater than 1600° C., and has a surface area of from 1 to 5 m$^2$/g. Magnesium oxide with a surface area of less than 1 m$^2$/g, is considered undesirable due to its separation to the outermost area of a mold during centrifugal molding of the composite product. On the other hand, magnesium oxide with surface area exceeding 5 m$^2$/g, is considered undesirable since the pulverization cost is increased markedly, and the particles tend to accummulate on the inner wall of the product during centrifugal molding. In the process for making the composites, the concrete is allowed to cure at about 159° C. to 200° C. under 6 to 15 atmospheres pressure.

Magnesium oxide as an expansive additive for construction cementing was also investigated by P. K. Mehta et al. in "Magnesium Oxide Additive For Producing Self Stress in Mass Concrete", 7th International Congress on the Chemistry of Cement, Paris 1980, Volume III, pages v-6,9. The authors considered the use of such expansive agent in cements curing at 32° C. to 54° C., to prevent crack formation. Magnesium oxide which was calcined at greater than or equal to 1200° C. was considered to hydrate too slowly. In fact, Portland cement paste containing 10% magnesium oxide having particulate sizes of 45 to 150 micrometers, produced expansions after 90 days ranging from 0.4% for magnesium oxide calcined at 900° C., down to less than 0.05% for magnesium oxide calcined at 1200° C. The paper concludes that magnesium oxide that was carefully calcined at between 900° to 950° C., and sized to between 300 and 1180 microns, was potentially suitable as an expansive agent for the purpose disclosed.

The effect of varying the temperature of calcination of magnesium oxide, on particle size, porosity and reactivity is discussed in the text "Magnesium Compounds", Volume 14, pages 628–631. There it is generally indicated that with increasing calcining time and temperature, the size of the crystallites produced increases, while the porosity and reactivity decreases. The text also states that dead burned magnesias are produced at calcining temperatures above 1400° C., which have crystallite sizes ranging from about 30 micrometers to more than 100 microns in diameter, and which exhibit low chemical reactivities.

Another paper of relevance in disclosing large numbers of attempts to produce expansive cements utilizing various additives, is that by W. Kurdowski, entitled "Expansive Cements", 7th International Congress on the Chemistry of Cement, Paris 1980, Vol I, pages v-2/1 to v-2/11.

Other articles which generally deal with calcination of magnesium oxide, include "Calcination Studies of Magnesium Oxides" by W. R. Eubank, *Journal of the American Ceramic Society*, V. 34, No. 8 (Aug. 1, 1951); "Relations Among Particle Size, Shape, and Surface Area of Mg(OH)$_2$ and Its Calcination Product", by V. A. Phillips et al., *Journal of the American Ceramic Society*, V. 61 No. 1–2 (January-February 1978); "Relation Between Pre-Cursor and Micro Structure in MgO", *Journal of the American Chemical Society -Discussions and Notes*, V. 56, No. 9 495 by W. Rhodes and B. Wuensch; and "Thermo Decomposition of Brucite: I, Electron and Optical Microscope Studies" *Journal of the American Ceramic Society*, V. 49 No. 12, R. S. Gordon and W. D. Kingery.

It will be seen, that none of the above references teach or suggest an expansive cement composition of the present invention, which is useful for cementing a casing within the wellbore of an oil, gas or other well, and contains as an expansive agent, magnesium oxide calcined at 1100° C. to 1500° C., at least 50% of the particles of which have a diameter of greater than 30 microns, and which has a surface area of about 0.8 to about 1.8 m$^2$/g. Such compositions, particularly where the acid neutralization time (ANT) of the magnesium oxide is also controlled within a defined range, have good linear expansions within high temperature wells, with very low amounts of magnesium oxide being required (particularly 0.25% to 1.0%).

SUMMARY OF THE INVENTION

Novel particulate magnesium oxide is provided which is prepared by calcining magnesium oxide at between about 1100° C. and about 1500° C. At least about 80% of the particles are between about 150 microns to about 400 microns in diameter. Such magnesium oxide, when present as a component of an aqueous hydratable cement slurry suitable for cementing a casing within a bore of a well (typically a Portland cement slurry), can produce expansion in the set cement when the temperature thereof is at least about 70° C. Preferably, the magnesium oxide is prepared by calcining at between about 1100° C. to about 1300° C. Further preferably, at least about 80% of the particles are between about 200 microns to about 325 microns in diameter. Further preferably, the calcining time is about 1 to about 3 hours. In addition, the BET surface area (that is, surface area as measured by the method described in BET Theory: Brunauer, Emmett and Teller, J.Am. Chem. Soc. 60, 309 (1938)), of the magnesium oxide is desirably between about 0.8 to about 1.8m$^2$/g. The magnesium oxide further preferably has an acid neutralization time for 1 g in 60 ml of deionized water with 20 ml added IN acetic acid, of between about 15 to about 30 minutes, and preferably between about 17 to about 25 minutes.

A novel expandable cement composition containing a hydratable cement, and magnesium oxide of the foregoing types, is also disclosed. The cement used may include a Portland cement, a high aluminate cement, or a gypsum cement, or any other hydraulic cementitious material such as type C fly ash. In such expandable cement compositions, magnesium oxide may be used which has only at least about 50% of its particles with a diameter of greater than about 30 microns, although preferably the particles have the preferred diameters disclosed above. Furthermore, there is disclosed a method for cementing a casing in a bore of a well, which comprises placing a cement slurry composition of the foregoing type between the casing and the bore. The magnesium oxide in such cases, results in an expansion of at least about 0.4% in the set cement within about 30 days, during a period in which the BHST of the well is between about 70° C. and about 290° C., and preferably between 70° C. and about 180° C.

Preferably, the magnesium oxide is prepared from magnesium hydroxide as a starting material. When the calcining temperature and time are carefully controlled within the ranges above, and the particle size of the magnesium hydroxide starting material is also controlled, it is possible to obtain a resulting magnesium oxide product which has particle sizes, a BET surface area, and an acid neutralization time within the parameters specified above, without any further processing of the magnesium oxide being required.

In order to obtain expansion of the set cement compositions described, in a wellbore, a temperature within the necessary range can be present both during placement and setting of the cement, or only during setting of the cement, or even after setting of the cement. The latter situation may occur in geothermal wells or in wells in which the higher BHST is achieved during a fire flood or similar procedure. In such situations, the effect of the expansion which would tend to be produced by the magnesium oxide, apparently counteracts the effect of thermal shock which might otherwise occur, as discussed earlier.

DETAILED DESCRIPTION OF EMBODIMENTS OF THE INVENTION

It has now been discovered that cement compositions with consistently high rates of unrestrained linear expansion and good compressive strengths can be obtained by using magnesium oxide as an expansive agent in the composition. However, to obtain such results it is necessary that the calcination conditions and particle size of the magnesium oxide be carefully controlled, preferably also along with the surface area and acid neutralization time. It has also been discovered that the required magnesium oxide particle size, surface area, and ANT can all be controlled simply by controlling calcining conditions of the magnesium oxide (including temperature, time and starting material). This latter feature allows magnesium oxide to be produced with particles of the required size and surface area, without the necessity of regrinding the particles. Regrinding tends to be a process which is inherently difficult to control in terms of size distribution of the magnesium oxide particles. Of course, if the magnesium oxide particle size distribution is not controlled, then the ability to obtain reproducible cement expansion results with different batches of magnesium oxide, would be affected.

A series of trials were performed, in order to ascertain the affect of magnesium oxide calcining conditions, surface area, and ANT, on cement expansions and compressive strengths. In all of the trials below and throughout this application, unless indicated otherwise, all expansions of cements are unrestrained linear expansions. These were measured by an apparatus and method of the type described in U.S. Pat. No. 4,408,489 to Spangle, after the cement has cured for the stated time and at the stated temperature under a pressure of 3000 psi. Of course, a higher unrestrained linear expansion would tend to indicate that when the expansion was restrained (as it would be in cementing a casing in a wellbore), a better bonding between the cement and the restraining surfaces (e.g. casing and wellbore) would result. All weight percentages(wt. %) given for all of the trials described below are based upon the weight of dry cement present(BWOC), unless otherwise indicated.

Trials were first performed to ascertain the effect of varying the calcining temperatures of magnesium oxide between 1000° C. and 1200° C. Magnesium hydroxide was used as a starting material in each case. The magnesium hydroxide was placed in the furnace for a period of four hours required to reach the indicated temperature, and held in the furnace at that temperature for an additional period of two hours, then removed and allowed to cool. Cement slurries were prepared with the resulting calcined magnesium oxides. Each slurry in these trials consisted of MARYNEAL LONE STAR Class H cement, 40 wt.% silica flour, 0.5 wt.% of a lignin sulfonate retarder, and 50 wt.% water, plus varying weight percentages of different magnesium oxide samples as described in Table I below. The expansions of the cements at 7, 14, 21, and 28 days, both at 200° F. (93° C.) and 300° F. (149° C.) are shown in FIG. 1.

TABLE 1

| Trial # | Calcining Temp. of MgO (°C.) | Wt. % MgO Present in Cement Slurry |
|---|---|---|
| 1 | 1200 | 2.5 |
| 2 | 1200 | 1.25 |
| 3 | 1200 | 3.75 |
| 4 | 1000 | 2.5 |
| 5 | 1000 | 5.0 |

Referring to FIG. 1, first comparing the results of Trial 1 with those of Trial 4, it will be seen that the same amount of magnesium oxide calcined at 1200° C., after 14 days, produced an expansion at 200° F. (93° C.) which was about 200% greater than that produced by magnesium oxide calcined at 1000° C., and was about 50% greater at 300° F. (149° C.) (149° C.). Likewise, it will be seen that the expansions produced after 14 days in Trial 2 (MgO calcined at 1200° C.) are significantly greater than the expansions produced in Trial 4 (MgO calcined at 1000° C.) even though in Trial 2 the magnesium oxide concentration is one-half that present in Trial 4. The same consistent results are observed from comparing Trial 3 and 5. That is, an expansion was obtained in Trial 3 (MgO calcined at 1200° C.) which was better than that obtained in Trial 5 (MgO calcined at 1000° C.), by an amount of about 300% at 93° C., and about 30% at 149° C., even though the concentration of magnesium oxide in Trial 3 was about 25% less than that in Trial -5. Thus, it is apparent that increasing the calcining temperature of the magnesium oxide from 1000° C. to 1200° C., substantially increases the amount of expansion which can be produced in set cement exposed to temperatures of about 70° C. to 150° C. for periods of 14 days or more, or even periods as short as 7 days or less.

A number of other trials were performed to investigate the effect of raising the calcining temperature of the magnesium oxide. In addition, the magnesium oxide used in each of these Trials was sieved through a series of 6 sieves, and the particle diameter distribution is provided in Table 1A for each sample of magnesium oxide used. Table 1A identifies the calcining temperature and duration of calcination at that temperature(often referred to herein as simply the "calcining time"), for each sample, as well as the corresponding trial number in Table 2 in which it was used as an expansive agent. The cement slurry compositions which were used to obtain the expansions provided in Table 2 were the same as those used in connection with the Trials of Table 1, with the exception that the magnesium oxide was prepared under different conditions. Bearing in mind that MgO calcined at about 1400° C. or higher for about 1 hour or longer will tend to fuse, it appears that all of the MgO samples calcined at 2600° F. (1400° C.) or higher were mechanically ground after calcining. Samples calcined at 2800° F. (1583° C.) (used in Trials 13 and 14), were definitely mechanically ground.

TABLE 1A

| Trial | Calcining Temp (°F.) Time (hours) | Wt. % (based on total weight of sample) Retained On Each Sieve Size (in microns) | | | | | | |
|---|---|---|---|---|---|---|---|---|
| | | 300 | 150 | 106 | 75 | 53 | 38 | Pan |
| 1-3[1] | 2190-2.0 | 2 | 4 | 5 | 6 | 9 | 28 | 46 |
| 7 | 2600-1.0 | 4.3 | 4.9 | 3.4 | 8.95 | 4.8 | 29.9 | 43.6 |
| 8 | 2600-2.0 | 3.9 | 4.8 | 4.7 | 14.6 | 6.4 | 21.9 | 43.6 |
| 9 | 2600-1.5 | 4.8 | 10.8 | 14.5 | 18.8 | 3.9 | 8.99 | 38 |
| 10 | 2200-1.5 | 1 | 1.5 | 5.0 | 11.14 | 16.9 | 31.75 | 32.5 |
| 11 | 2200-1.0 | .05 | 0.6 | 18 | 27.4 | 9.2 | 12.5 | 32.4 |
| 12 | 2200-2.0 | 1 | 1.6 | 5.5 | 16.9 | 31.3 | 25.3 | 18.3 |
| 13 | 2800-1.0 | 6.3 | 8.2 | 7.6 | 18.1 | 15.7 | 32.2 | 11.9 |
| 14 | 2800-2.0 | 7.5 | 12 | 10.2 | 29 | 17.5 | 17.2 | 6.4 |

[1]See Table 1 for expansions in cements using the magnesium oxide

TABLE 2

| Trial | % Expansion[1] | | Compressive Strength (psi) | |
|---|---|---|---|---|
| | 93° C. | 149° C. | 93° C. | 149° C. |
| 7 | 0.13 | 2.10 | 3520 | 1800 |
| 8 | 0.22 | 1.62 | 2750 | 2300 |
| 9 | 0.28 | 4.72 | 2300 | 1400 |
| 10 | 0.16 | 2.73 | 2800 | 2700 |
| 11 | 0.18 | 0.35 | 2500 | 2000 |
| 12 | 0.20 | 2.96 | 2800 | 1400 |
| 13 | 0.17 | 0.70 | 4000 | 2500 |
| 14 | 0.10 | 1.20 | 2100 | 1500 |

[1]Expansion as measured after 7 days at indicated temperature.

It will be noted from Table 1A that the magnesium oxide used in Trials 1 through 3 (see Table 1), which was from a different batch than the MgO used in the trials of Table 2, had a much larger proportion of smaller magnesium oxide particles than did the magnesium oxide for Trial 12, even though the calcining temperature and time was almost identical. This can be due to factors which include the particle size of the starting material, or may be simply as a result of sieving by the manufacturer.

The results in Table 2 generally indicate that where calcining time is the same, the highest linear expansions are obtained at calcining temperatures of 2200° F. (1200° C.) and 2500° F. (142° C.), versus 2800° F. (1540° C.) This appears particularly true when the temperature to which the cement is exposed is 300° F. (149° C.) The foregoing can be observed, for example, from the greater linear expansion obtained in Trial 8 versus Trial 14, Trial 7 versus 13 (at least at 300° F. (149° C.), the results at 200° F. (93° C.) being almost the same), and Trial 12 versus 14. The foregoing does not appear to be the case though, for the results of Trial 11 at 300° F. (149° C.) versus those of Trial 13 at the same temperature. However, this may be a result of the fact that, as shown in Table 1A, the magnesium oxide used in Trial 11 has a larger number of particles which are smaller than 38 microns in diameter. As can be seen from comparing the expansions obtained in Trials 1-3 in FIG. 1, with those of Trial 12 (all having almost identical calcination temperatures and times), a larger proportion of particles below 40 microns in size, tends to result in substantially reduced expansion at 300° F. (149° C.)

It will be noted in almost all of Trials 7 through 14, that good compressive strengths were obtained. The cements of Trials 9 and 12 did not exhibit the compressive strengths as high as the remainder of those trials, at least at 300° F. (149° C.). Under conditions of restrained expansion, cements such as those of Trial 9, would be expected to exhibit good compressive strengths. It should of course also be borne in mind that all of the results in Table 2, were obtained using 3 wt. % magnesium oxide (BWOC) (Trials 1, 2 and 3, of Table 1 again using 2.5, 1.25, and 3.75 wt. % of magnesium oxide, respectively).

In order to investigate the effect of particle size on linear expansion and compressive strength, a number of further trials were performed using magnesium oxide which had been calcined in trays in a furnace, which required 3 hours to heat from 80° F. (27° C.) to 2200° F. (12 , and was retained at the temperature of 2200° F. (1205° C.) for 2 hours, following which the magnesium oxide was removed for cooling. Expansion tests were obtained using a slurry of PERMANENTE Class G cement plus 0.3 wt. % lignosulfonate retarder, and 44 wt. % water. In each Trial, the magnesium oxide was sieved to be within the size range indicated. All expansions were measured with the cement exposed to a temperature of 200° F. (93° C.) for 7 and 14 days. The compressive strength was also measured at 14 days. The results appear in Table 3 below.

TABLE 3

LINEAR EXPANSIONS AND COMPRESSIVE STRENGTHS PRODUCED BY SIEVED FRACTIONS OF MgO SAMPLE CALCINED AT 1205° C., FOR 2 HOURS (CEMENT CURED AT 93° C.) (PERMANENTE CLASS G + 0.3% RETARDER + 44% H₂O)

| TRIAL | MgO WT. % (BWOC) | ON 20 MESH (>840 MICRONS) | 20-30 MESH (840-590) MICRONS | 30-40 MESH (590-420) MICRONS | 40-50 MESH (420-297) MICRONS | 50-60 MESH (299-250) MICRONS | 60-100 MESH (250-150) MICRONS | 100-PAN (150-1) MICRONS |
|---|---|---|---|---|---|---|---|---|
| 15 | 0.25 | 1.1 | 0.4 | 0.26 | 0.1 | — | — | — |
| | | (1.2) | (0.4) | (0.29) | (0.1) | | | |
| | | 675 | 2240 | 3190 | 4040 | | | |
| 16 | 0.50 | 2.3 | 1.8 | 0.35 | 0.2 | — | — | — |
| | | 2.3 | (1.8) | (0.36) | (0.2) | | | |
| | | 480 | 650 | 4340 | 5130 | | | |
| 17 | 0.75 | 3.0 | 2.8 | 2.14 | 0.22 | — | — | — |
| | | (3.1) | (2.8) | (2.2) | (0.24) | | | |

TABLE 3-continued
LINEAR EXPANSIONS AND COMPRESSIVE STRENGTHS PRODUCED BY SIEVED FRACTIONS OF MgO SAMPLE CALCINED AT 1205° C., FOR 2 HOURS (CEMENT CURED AT 93° C.) (PERMANENTE CLASS G + 0.3% RETARDER + 44% H₂O)

| TRIAL | MgO WT. % (BWOC) | ON 20 MESH (>840 MICRONS) | 20-30 MESH (840-590) MICRONS | 30-40 MESH (590-420) MICRONS | 40-50 MESH (420-297) MICRONS | 50-60 MESH (299-250) MICRONS | 60-100 MESH (250-150) MICRONS | 100-PAN (150-1) MICRONS |
|---|---|---|---|---|---|---|---|---|
| 18 | 1.00 | 160<br>3.5<br>(3.6) | 315<br>3.5<br>(3.5) | 760<br>3.0<br>(3.0) | 4390<br>0.7<br>(1.2) | 0.23<br>(0.44) | — | — |
| 19 | 1.25 | | 90<br>(3.1) | 205<br>(0.96) | 325<br>3.0<br>(3.1) | 1515<br>0.57<br>(0.96) | 4150<br>0.13<br>(0.38) | — |
| 20 | 1.75 | | | | 480<br>— | 3600<br>— | 3500<br>1.07<br>(1.5) | 0.02<br>(0.20) |
| 21 | 2.25 | | | | | | 2670<br>— | 6070<br>0.03<br>(0.38)<br>4830 |

NOTE: DATA FOR EACH TRIAL IS ARRANGED AS:
7 DAY EXPANSION
(14 DAY EXPANSION)
14 DAY COMPRESSIVE STRENGTH (PSI)

As is apparent from Table 3, larger particles of magnesium oxide invariably result in a larger linear unrestrained expansion. However, such is also accompanied by corresponding reductions in compressive strength. Although the compressive strength as measured in the unrestrained linear expansion tests, will likely be less than that resulting from a restrained situation such as may be present in cementing a casing within a wellbore, nevertheless it should not be too low. The best particle size range which will produce linear expansions of about 0.5% after 14 days without unduly sacrificing compressive strengths, at least for a cement exposed to a temperature of 200° F., appears from Table 3 to be 150 to 420 microns. It will also be observed from Table 3 that increasing the weight percent of any given particle size of magnesium oxide present, invariably increases the expansion. However, it will be observed that the foregoing relationship is not a proportional one, particularly in the 0.5 to 1.25 wt. % range with particle sizes of 150 to 420 microns. In such a particle size range, the 14 day expansions are increased dramatically over what would be expected, based upon the increased proportion of magnesium oxide present.

As a measure of chemical reactivity, a study of the acid neutralization times (ANT) of the magnesium oxide used in Trials 6-14 of Table 2, was conducted. In addition, these samples were examined under the scanning electron microscope (SEM) and an average "crystallite" size determined. It should be noted that the crystallite size, is distinct from the particle size which is indicated by sieving, since it was evident from the SEM studies that the particles of magnesium oxide were made up of individual smaller particles (referred to as crystallites) fused together. However, in those samples calcined at higher temperatures and times, the crystallites became less well defined and appeared to be more fused together, to result in an overall lower surface area of the particles. It will be seen from Table 4 that this observation conforms with the fact that the ANT (which would be expected to vary inversely with the surface area of the particles) increased with increasing calcination temperatures and times (indicating a decreased surface area of the particles). Further, the expected surface area of solid spherical particles of magnesium oxide can be calculated to be between 0.011 m²/g (for 150 micron diameter particles) and about 0.004 m²/g (for 420 micron diameter particles), which are substantially less than the measured surface areas in Table 4.

It will also be seen from the measured expansions in Table 2, that with the exception of the magnesium oxide sample used for Trial 14, increasing the ANT up to a certain point (about 30 minutes) will result in increased cement expansion. When the ANT is increased beyond that point, the cement expansion tends to then decrease. However it is apparent from those Trials and Trials 1-3, that not only must the ANT, and hence surface area, be controlled, but also that the particle size range must also be controlled, as already shown by Table 3. Thus, from the general trend discussed in connection with Table 4 and reviewing the 300° F. (149° C.) expansions in Table 2, it appears that the best expansions are obtained with magnesium oxide samples having ANTs somewhere between about 20 to 30 minutes. Further, as already shown by Table 3, the best particle size should simultaneously be between about 150 to 420 microns.

Bearing the above factors in mind, magnesium oxide samples were prepared by calcining at 2100° F. (1150° C.) for 2 hours at the foregoing temperature, in a conveyor tunnel kiln with 10 pound (lb.) trays. The starting material was magnesium hydroxide. A total of 75 drums of magnesium oxide prepared under the foregoing conditions, were obtained from a supplier. Samples of magnesium oxide from every fifth drum were taken. These samples were checked for BET surface area using a MICROMERITICS FLOW SORB II 2300 (rapid surface area instrument). The ANT of these samples was also measured, and they were sieved to determine the particle size distribution. These samples were then used in varying wt. %'s as expansive agents in expansive cement slurry compositions consisting of 793 grams PERMANENTE Class G cement, 0.3% lignosulfonate retarder, 0.5% bentonite and 44% water. The slurries were allowed to hydrate to a hardened state at 200° F. (93° C.), and some also at 300° F. (149° C.) All of the foregoing variables, other than particle size, are tabulated in Table 5. The results of the sieving to ascertain particle size, are tabulated in Table 6. It might be noted that drums 55-75, were from a second batch of magnesium oxide, which as will be noted from Table 6, tended to have slightly more smaller magnesium oxide particles. Column A of the BET and ANT measurements were provided by the magnesium oxide supplier, whereas the column B measurements were measured by applicant. All expansion measurements were obtained from two different samples, as indicated in Table 5, although expansion measurements were not obtained for all of the magnesium oxide samples other than at 200° F. (93° C.) with 0.5 wt. % magnesium oxide.

TABLE 4

ANT AND CRYSTALLITE SIZE

| CALCINING | | | AVERAGE |
|---|---|---|---|
| TEMPERA-TURE (C.°) | TIME (HOURS) | ANT MINUTES | CRYSTALLITE SIZE MICROMETERS |
| 1200 | 2* | 18 | 1.5 |
| 1200 | 1 | 18 | 1.5 |
| 1200 | 1.5 | 28 | ** |
| 1200 | 2 | 27 | 1.7 |
| 1427 | 1 | 53 | ** |
| 1427 | 1.5 | 70 | 4.5 |
| 1427 | 2 | 70 | 5 |
| 1538 | 1 | 98 | 6 |
| 1538 | 1.5 | 150 | ** |
| 1538 | 2 | 159 | 7.5 |

*This MgO sample was prepared in-house, remainder obtained from an outside supplier
** Not determined

TABLE 5A

EXPANSION AT 93° C.

| Drum | BET (m²/g) A | BET (m²/g) B | ANT (minutes) A | ANT (minutes) B | 0.5 wt. % MgO 3 Days | 7 days | 11 days | 14 days |
|---|---|---|---|---|---|---|---|---|
| 5 | | 1.59 | 23.6 | 20.7 | 0.32 | 1.27 | 1.50 | 1.52 |
| | | | | | 0.34 | 1.15 | 1.37 | 1.40 |
| 10 | | 1.22 | 25.3 | 22.5 | 0.30 | 1.29 | 1.46 | 1.46 |
| | | | | | 0.28 | 1.20 | 1.38 | 1.38 |
| 15 | 1.29 | 1.36 | 22.7 | 23.7 | 0.13 | 1.09 | | 1.29 |
| | | | | | 0.11 | 1.77 | | 0.89 |
| 20 | | 1.31 | 23.7 | 21.7 | 0.16 | 1.08 | 1.23 | 1.28 |
| | | | | | 0.19 | .94 | 1.08 | 1.13 |
| 25 | | 1.36 | 25.5 | 22.7 | 0.29 | 1.04 | 1.19 | 1.21 |
| | | | | | 0.34 | 1.18 | 1.33 | 1.36 |
| 30 | 1.21 | 1.45 | 23.1 | 23.7 | 0.33 | 1.23 | 1.45 | 1.47 |
| | | | | | 0.20 | 1.05 | 1.27 | 1.27 |
| 35 | | 1.26 | 20.4 | 22.5 | 0.13 | 0.24 | | 0.25 |
| | | | | | 0.14 | 0.28 | | 0.32 |
| 40 | | 1.44 | 25.9 | 24.0 | 0.25 | 1.10 | 1.27 | 1.33 |
| | | | | | 0.22 | 0.83 | 1.00 | 1.14 |
| 45 | 1.21 | 1.32 | 23.9 | 23.8 | | | | |
| 50 | | 1.35 | 20.1 | 20.2 | 0.36 | 1.16 | 1.48 | 1.47 |
| 55 | | 1.05 | | 21.4 | 0.21 | 0.84 | 1.04 | 1.11 |
| | | | | | 0.26 | 1.23 | 1.55 | 1.58 |
| 60 | | 1.10 | 21.0 | 22.1 | 0.20 | 1.05 | 1.50 | 1.54 |
| | | | | | 0.16 | 0.65 | 0.98 | 0.96 |
| 65 | | 1.26 | 23.4 | 24.0 | 0.19 | 0.60 | 0.91 | 0.96 |
| | | | | | 0.25 | 1.09 | 1.44 | 1.47 |
| 70 | 0.95 | 1.05 | 27 | 20.4 | 0.45 | 1.10 | 1.38 | 1.30 |
| | | | | | 0.09 | 0.26 | | 0.29 |
| | | | | | 0.06 | 0.20 | | 0.24 |
| 75 | | 1.19 | 29.3 | 24.1 | 0.31 | 1.56 | 1.68 | 1.75 |
| | | | | | 0.32 | 1.37 | 1.56 | 1.59 |

TABLE 5B

| | EXPANSION AT 93° C. | | | | | | | | EXPANSION AT 149° C. | | | | | | | |
|---|---|---|---|---|---|---|---|---|---|---|---|---|---|---|---|---|
| | 0.75 Wt. % MgO | | | | 1.0 Wt. % MgO | | | | 0.5 wt. % MgO | | | | 1.0 wt. % MgO | | | |
| Drum | 3 | 7 | 11 | 14 | 3 | 7 | 11 | 14 | 3 | 7 | 11 | 14 | 3 | 7 | 11 | 14 |
| 5 | | | | | | | | | | | | | | | | |
| 10 | | | | | | | | | | | | | | | | |
| 15 | | | | | 0.35 | 1.56 | | 1.70 | 0.82 | 0.86 | | 0.88 | 1.94 | 1.95 | | 1.97 |
| | | | | | 0.47 | 1.30 | | 1.42 | 0.45 | 0.48 | | 0.48 | 2.00 | 2.01 | | 2.01 |
| 20 | | | | | | | | | | | | | | | | |
| 25 | | | | | | | | | | | | | | | | |
| 30 | | | | | | | | | | | | | | | | |
| 35 | 1.87 | 3.16 | | 3.20 | 1.76 | 3.16 | | 3.27 | 0.53 | 0.62 | | 0.62 | 3.56 | 3.64 | | 3.64 |
| | 1.11 | 2.62 | | 2.69 | 0.25 | 1.17 | | 2.00 | 1.02 | 1.10 | | 1.12 | 3.47 | 3.45 | | 3.45 |
| 40 | | | | | | | | | | | | | | | | |
| 45 | | | | | 0.70 | 2.83 | | 2.92 | | | | | 2.36 | 2.18 | | 2.19 |
| | | | | | 1.35 | 3.16 | | 3.22 | | | | | 1.10 | 1.14 | | 1.19 |
| 50 | | | | | | | | | | | | | | | | |
| 55 | | | | | | | | | | | | | | | | |
| 60 | | | | | | | | | | | | | | | | |
| 65 | | | | | | | | | | | | | | | | |
| 70 | | | | | 0.35 | 1.51 | | 1.71 | 0.64 | 0.69 | | 0.72 | 2.04 | 2.10 | | 2.12 |
| 75 | | | | | 0.50 | 1.83 | | 1.98 | 0.94 | 0.98 | | 0.99 | 2.62 | 2.69 | | 2.65 |

TABLE 6

Wt. % MgO Retained on Each Mesh In a Series of Meshes

| Sample | % on 20[1] | % on 40[1] | % on 50[1] | % on 60[1] | % on 70[1] | % on 100[1] | % on Pen[1] |
|---|---|---|---|---|---|---|---|
| 5 | 0.04 | 7.5 | 72 | 2.2 | 16 | 0.8 | 0.6 |
| 10 | 0.62 | 9.7 | 68.5 | 2.6 | 16.9 | 1.2 | 0.8 |
| 15 | 0.03 | 7.8 | 73.2 | 0.9 | 16.3 | 0.9 | 0.8 |
| 20 | 0.05 | 9.8 | 72.8 | 0.2 | 15.7 | 0.8 | 0.7 |
| 25 | 0.04 | 9.1 | 72.1 | 0.9 | 16.4 | 0.8 | 0.6 |
| 30 | 0.05 | 6.5 | 70.1 | 1.3 | 18.0 | 1.9 | 1.3 |
| 35 | 0.02 | 7.3 | 73.6 | 1.7 | 15.7 | 0.8 | 0.9 |
| 40 | 0.04 | 11.1 | 71.1 | 1.2 | 14.7 | 1.6 | 0.85 |
| 45 | 0.05 | 7.8 | 75.3 | 0.8 | 14.4 | 0.9 | 0.7 |
| 50 | 0.04 | 4.5 | 70.4 | 0.3 | 20.8 | 2.0 | 1.9 |
| 55[2] | 0.04 | 3.1 | 72.9 | 0.9 | 20.2 | — | 2.87 |
| 60[2] | 0.03 | 4.1 | 67.4 | 0.8 | 24.5 | — | 3.1 |
| 65[2] | 0.03 | 4.0 | 69.5 | 1.1 | 22.07 | — | 3.3 |
| 70[2] | 0.04 | 3.2 | 67.9 | 1.4 | 23 | — | 4.5 |
| 75[2] | 0.03 | 3.4 | 67.1 | 1.7 | 24 | — | 3.8 |

[1]All mesh sizes as U.S. mesh
[2]For samples 55-75, the 100 mesh was not used

It will be seen from Table 5, that a good unrestrained linear expansion within the desirable range of 0.5 to 1.5% for cements used in cementing well casings, is obtained at temperatures of 200° F. (93° C.) and 300° F. (149° C.) after 14 days with only about 0.5 wt. % (BWOC) magnesium oxide being required. At 300° F. (149° C.), it is in some cases necessary to use about 1.0 wt. % magnesium oxide. However, it will be noted that this is only about one third (⅓) of the amount of magnesium oxide used in Trial 12, Table 2 to produce similar results(in which magnesium oxide, the particle size and surface area were not controlled within the limits already defined). Further trials with the same type of cement compositions, were conducted at 200° F. (93° C.) and under a pressure of 3000 psi, using 0.5 wt. % magnesium oxide only. The linear expansions, and compressive strengths obtained in the set cement compositions, are summarized in Table 7 below.

TABLE 7

| Drum | % Expansion at 21 Days (93° C., 3000 psi) | Compressive Strength (psi) |
|---|---|---|
| 2 | 0.59 | 3130 |
|   | 0.74 | 3700 |
| 5 | 0.77 | 1776 |
|   | 0.82 | 2243 |
| 11 | 0.74 | 2967 |
|   | 0.84 | 2248 |
| 14 | 1.05 | 1407 |
|   | 1.68 | 1285 |
| 17 | 1.24 | 1341 |
|   | 1.53 | —[1] |
| 20 | 1.01 | 1121 |
|   | 0.93 | 1192 |
| 26 | 1.26 | 1220 |
|   | 1.32 | 1005 |
| 29 | 0.99 | 2196 |
|   | 1.08 | 2360 |

[1]Specimen was cracked

As again will be seen from the results of Table 7, 0.5% of the magnesium oxide within the foregoing parameters, can produce a cement with a linear expansion in the desired range of 0.5 to 1.0%, and having a compressive strength of between about 1000 to over 3000 psi. The higher expansive cement compositions of course, tend to have compressive strengths in the lower end of the foregoing range. However, under restrained conditions, the compressive strengths would tend to be higher. To illustrate this fact, a number of trials were conducted using another magnesium oxide sample, which had been calcined at 2300° F. for 2 to 2.5 hours. This magnesium oxide had an ANT of 26.4 minutes and a BET surface area of 0.82 m$^2$/g. Samples of this magnesium oxide were sieved through a series of meshes. The weight percentage retained on each mesh is summarized in Table 7A below ("Pan" refers to the material which passes through even the smallest mesh used).

TABLE 7A

| U.S. Mesh Size | Wt. % of total retained |
|---|---|
| 20 | 32 |
| 40 | 25 |
| 50 | 17 |
| 60 | 0.4 |
| 70 | 11 |
| 100 | 8 |
| Pan | 7.3 |

Various weight percentages of this magnesium oxide was then used in a cement slurry containing PERMANENTE Class G cement, 0.3 wt. % of a lignosulfonate retarder, 0.5 wt. % of bentonite, and 44 wt. % water (all weight percentages BWOC). The unrestrained linear expansions and compressive strengths of the set slurries were measured. Furthermore, the same type of slurries were allowed to set in cubes and compressive strengths measured, all as described in American Pertroleum Specification 10 (January, 1982). These latter compressive strengths then are horizontally restrained compressive strengths (but not vertically restrained). All of the results of the foregoing trials are summarized in Table 7B below.

TABLE 7B

| MgO | 7 Day Unrestrained Expansion (%) | 7 Day Unrestrained Compressive Strength (psi) | 7 Day Horizontally Restrained Compressive Strength (psi) |
|---|---|---|---|
| 0 | 0.186 | 3280 | 4875 |
| 0 | 0.141 | — | 5063 |
| 0.25 | 0.264 | 3084 | 5000 |
| 0.25 | 0.339 | — | 4625 |
| 0.50 | 0.624 | 3075 | 4113 |
| 0.50 | 0.788 | — | 4500 |
| 0.75 | 2.43 | 2784 | 3938 |
| 0.75 | 2.37 | — | 4688 |

It will be seen from Table 7B then, that the horizontally restrained compressive strength is always higher than the unrestrained compressive strength. Of course if the cement was allowed to set under totally restrained conditions (which is almost the situation during the cementing of a typical oil or gas well), it would be expected that the restrained compressive strength would actually increase with increased amounts of magnesium oxide.

To ascertain the effectiveness of cements using magnesium oxide of the type described, as an expansive agent, a field trial was conducted in which a steel casing was cemented in place within the wellbore of an oil well. The well had a depth of 13,400 feet, a BHST of 210° F. and a bottom hole circulating temperature (BHCT) of 174° F. (80° C.) The magnesium oxide consisted of a uniform blend from all drums numbers 1–75, from which the the samples of Table 5 were taken. 0.35 wt. % magnesium oxide was used. The cement system used had the following paramenters:

LONE STAR Class H cement, plus 0.5 wt. % sodium salt of a napthalene sulfonate retarder, 0.1 wt. % lignosulfonate retarder, 0.5 wt. % fluid loss retarder, and 34 wt. % water (all wt. %'s BWOC).

The same composition was prepared in the laboratory, and the measured expansion in the lab, at 210° F. (99° C.) and 10,000 psi. after 14 days was 0.68% (average of 2 trials). Specimens of the mixed cement composition were taken from both the initial field mix, and the final field mix, prior to pumping down the well. The expansion of these specimens were then measured in the laboratory again at 210° F. (99° C.) and 10,000 psi after 14 days. The expansions were 0.68 and 0.80% for the initial and final mix specimens, respectively (both from an average of two measurements). Ten days after placing of the cement in the well, a bond log was run which showed better than expected casing and wellbore bonding to the cement. Other wells in the same general area also showed signs of gas leakage within about two weeks after cement placement, whereas the test well showed no such signs of leakage even after 2 weeks following cement placement.

It has also been discovered that cement compositions of the above-described type, containing magnesium oxide of the parameters already described, will not exhibit any significant expansion at lower temperatures, but when later exposed to higher temperatures, will then exhibit significant expansion. This is true even where the cement has already set. To illustrate the foregoing, a cement slurry was prepared using PERMANENTE Class G cement, 35 wt. % (BWOC) silica flour, 50% (BWOC) water, and a given wt. % of magnesium oxide. The magnesium oxide used had an acid neutralization time of between 20.5 and 21.7 minutes, and a BET measured surface area of between one m²/g and 1.23 m²/g. The particle size distribution of the magnesium oxide was as follows ("ON PAN" refers to magnesium oxide which passed through even the finest mesh used):

| 40 MESH | 50 MESH | 60 MESH | 70 MESH | ON PAN |
|---|---|---|---|---|
| 0.6% | 51.2% | 26.5% | 17.9% | 3.8% |

The linear expansions measured after exposure for various times at various temperatures are summarized in Table 8 below:

TABLE 8

| | % Expansion at 3000 psi Curing Pressure | | |
|---|---|---|---|
| Wt. % MgO | After 14 Days @ 27° C. | After additional 5 days @ 149° C. | After Further 10 days @ 149° C. |
| 1.0 | 0.11 | 4.22 | 4.23 |
| 1.0 | 0.16 | 4.67 | 4.61 |
| 0.75 | 0.24 | 3.63 | 3.59 |
| 0.75 | 0.09 | 3.73 | 3.71 |
| 0.5 | 0.14 | 3.10 | 3.07 |
| 0.5 | 0.20 | 3.73 | 3.73 |

These data show that such expansive cement compositions of the present invention, are useful in situations where the initial set cement may be exposed only to a low temperature, but some time after setting, is exposed to a higher temperature. Such situations include wells exposed to the heat from fire flooding, or to geothermal wells. Not only would the compressive strength of such cement compositions not decrease under restrained conditions with such temperature variations, it would in fact be expected to increase.

To illustrate that magnesium oxide calcined under the above described calcination conditions, can also produce significant expansion in non-Portland type cements, a number of further trials were conducted and the data summarized in Table 9 below. In the following trials, the surface area of the magnesium oxide particles, and the ANT were not controlled within the desired specifications given above. Also, the same magnesium oxide was used in the Trials 2, 4, and 6 of Table 9 below, as was used in Trial 8 of Table 2 above. It would be expected then, that higher expansions would be obtained when surface area, particle size, and ANT of the magnesium oxide are controlled within the preferred parameters discussed above. Trial 8, Table 9, used magnesium oxide calcined at approximately 1200° C., particle sizes between about 150 to about 425 microns (40 to 100 mesh)., surface area 1.49 m²/g, ANT 16.8 minutes. In each case, the cement slurries were poured into molds and the temperature and pressure maintained at 300° F. (149° C.) and 3000 psi, respectively, until all of the expansion measurements made in Table 9 were completed.

TABLE 9

| Trial | Cement System | Added MgO Wt. % (BWOC) | Expansion (%) 7 Days | 14 Days | 28 Days | Compressive Strength (psi) |
|---|---|---|---|---|---|---|
| 1 | FONDU, High Aluminous | 0.0 | 0.02 | 0.03 | 0.27 | 617 |
| 2 | FONDU, High Aluminous | 1.5 | 3.8 | 4 | 3.8 | 145 |
| 3 | UNADEEP, Class J | 0.0 | 0.11 | 0.13 | 0.13 | 2673 |
| 4 | UNADEEP, Class J | 1.5 | 0.17 | 0.2 | 0.26 | 4229 |
| 5 | Type C Fly Ash | 0.0 | 0.31 | 0.35 | 0.42 | 1075 |
| 6 | Type C Fly Ash | 1.5 | 2.0 | 1.8 | 1.9 | —[1] |
| 7 | Plaster of Paris[2] | 0.0 | 0.13 | —[3] | —[3] | —[3] |
| 8 | Plaster of Paris[2] | 1.0 | 0.70[4] | —[3] | —[3] | —[3] |

[1]Not measured, specimen cracked
[2]Coarse grind, contained sufficient retarder to increase workability time to approximately 60 minutes, from a normal 15 minutes
[3]Not measured
[4]Average of two trials Various modifications and alterations to the embodiments described above, but which still produce compositions and methods within the scope of this invention, will become apparent to those skilled in the art. Accordingly, the scope of the invention is to be interpreted from the following claims read in light of the foregoing disclosure.

I claim:

1. An expandable cement composition useful for cementing a well casing within the bore of a well, and which sets in no less than about 12 hours, comprising:
    (a) a hydratable cement;
    (b) 0.25 to 3.75 percent by weight of cement magnesium oxide which has been calcined at between about 1100° C. and about 1500° C., and which has at least about 50% of the particles with a diameter of greater than about 30 microns, so as to produce an expansion in the set cement composition of at least about 0.2% when the set composition is exposed to a temperature of at least about 70° C.

2. An expandable cement composition as defined in claim 1 wherein the cement is selected from Portland cement, a high aluminate cement, and a gypsum cement.

3. An expandable cement composition useful for cementing a well casing within the bore of a well, comprising:
    (a) a Portland cement;
    (b) 0.25 to 3.75 percent by weight of cement magnesium oxide which has been calcined at between about 1100° C. and about 1500° C., and which has at least about 50% of the particles with a diameter of greater than about 30 microns, so as to produce an expansion in the set cement composition of at least about 0.2% when the set composition is exposed to a temperature of at least about 70° C.

4. An expandable cement composition as defined in claim 3, wherein a sufficient amount of magnesium oxide is present to produce an expansion in the set cement composition of at least about 0.5% when the set composition is exposed to at least one temperature which is within the range of about 200° C. to about 500° C.

5. An expandable cement composition as defined in claim 4, wherein 80% of the magnesium oxide particles have a diameter of between about 150 to about 400 microns, and wherein the magnesium oxide particles have a BET surface area of between about 1 and about 2 $m^2/g$.

6. An expandable cement composition as defined in claim 5, wherein the magnesium oxide has been calcined at between about 1150° C. and about 1250° C.

7. An expandable cement composition as defined in claim 6 wherein at least about 80% of the magnesium oxide particles have a diameter of between about 200 to 325 microns.

8. An expandable cement composition as defined in claim 7 wherein the acid neutralization time of 1 g of the magnesium oxide in 60 ml. of deionized water with 20 ml. added 1N. acetic acid, is between about 21 to about 30 minutes.

9. An expandable cement composition as defined in claim 7 wherein the acid neutralization time of 1 g of the magnesium oxide in 60 ml. of deionized water with 20 ml. added 1N. acetic acid, is between about 17 to about 25 minutes.

10. A method of cementing a casing in a bore of a well, comprising placing a cement slurry composition between the casing and the bore, which composition comprises a hydratable cement and 0.25 to 3.75 percent by weight of cement particulate magnesium oxide produced by calcining magnesium oxide at between about 1100° C. and about 1500° C., which has at least about 80% of the particles between about 150 microns to about 400 microns in diameter, so as to produce on expansion of at least about 0.4% in the set cement within about 30 days during a period in which the bottom hole static temperature of the well is between about 70° C. and about 290° C.

11. A method as defined in claim 10 wherein the hydratable cement of the cement slurry composition is a Portland cement.

12. A method of cementing a casing in a bore of a well, comprising placing a cement slurry composition between the casing and the bore, which composition comprises a hydratable cement and 0.25 to 3.75 percent by weight of cement particulate magnesium oxide produced by calcining magnesium oxide at between about 1100° C. and about 1500° C., which has at least about 80% of the particles between about 150 mirons to about 400 microns in diameter, so as to produce an expansion of at least about 0.4% in the set cement within about 30 days during a period in which the bottom hole static temperature of the well is between about 70° C. and about 180° C.

13. A method as defined in claim 12 wherein at least about 80% of the magnesium oxide particles are between about 200 to about 300 microns in diameter.

14. A method as defined in claim 13 wherein the magnesium oxide has been prepared by calcining at between about 1100° C. to about 1300° C. for between about 1 to about 3 hours.

15. A method as defined in claim 14 wherein the BET surface area of the particles is between about 0.8 to about 1.8 $m^2/g$.

16. A method as defined in claim 15, wherein the acid neutralization time of 1 g of the magnesium oxide in 60 ml. of deionized water with 20 ml. added 1 N. acetic acid, is between about 15 to about 30 minutes.

17. A method as defined in claim 15 wherein the acid neutralization time of 1 g of the magnesium oxide in 60 ml. of deionized water with 20 ml. added 1 N. acetic acid, is between about 17 to about 25 minutes.

18. A method as defined in claim 16 wherein the magnesium oxide was prepared from magnesium hydroxide as a starting material.

19. A method as defined in claim 17 wherein the bottom hole static temperature of the well is between about 70° C. and about 290° C. during placement of the cement.

20. A method as defined in claim 17 wherein the bottom hole static temperature of the well is less than about 30° C. during placement of the cement, the method additionally comprising exposing the set cement to bottom hole static temperature of between about 70° C. and about 290° C.

21. A method as defined in claim 18 wherein the bottom hole static temperature of the well is between about 70° C. and about 290° during placement of the cement.

22. A method as defined in claim 18 wherein the bottom hole static temperature of the well is less than about 30° C. during placement of the cement, the method additionally comprising exposing the set cement to bottom hole static temperature of between about 70° C. and about 290° C.

* * * * *